United States Patent [19]

Brandon

[11] Patent Number: 4,653,419
[45] Date of Patent: Mar. 31, 1987

[54] HULL PROTECTING FENDER APRON

[76] Inventor: Larry L. Brandon, 1517 Ponce De Leon Dr., Fort Lauderdale, Fla. 33316

[21] Appl. No.: 803,415

[22] Filed: Dec. 2, 1985

Related U.S. Application Data

[63] Continuation-in-part of Ser. No. 674,647, Nov. 26, 1984, abandoned.

[51] Int. Cl.$^4$ ............................................. B63B 59/02
[52] U.S. Cl. ....................................... 114/219; 114/361
[58] Field of Search ................ 114/219, 221 R, 343, 114/361, 364

[56] References Cited

U.S. PATENT DOCUMENTS

| | | | |
|---|---|---|---|
| 2,577,236 | 12/1951 | Doherty | 114/219 |
| 3,000,021 | 9/1961 | Lang | 114/219 |
| 3,055,022 | 9/1962 | Vallquist | 114/343 |
| 3,220,026 | 11/1965 | Lichti | 114/219 |
| 3,261,320 | 7/1966 | Leonard | 114/219 |
| 4,084,533 | 4/1978 | Boyer | 114/219 |

FOREIGN PATENT DOCUMENTS

| | | | |
|---|---|---|---|
| 9910 | 1/1980 | Japan | 114/219 |
| 525017 | 8/1940 | United Kingdom | 114/219 |
| 2091842 | 8/1982 | United Kingdom | 114/219 |

Primary Examiner—Sherman D. Basinger
Assistant Examiner—Stephen P. Avila
Attorney, Agent, or Firm—Alvin S. Blum

[57] ABSTRACT

A fender apron protects the surface finish of a boat hull from dirt and damage from the actions of a boat fender in use. The apron is constructed of a flexible, resilient transparent plastic sheet. It is secured between the hull and the fender. It is adapted to move with and cling to the boat so that the fender moves against the outer surface of the apron.

9 Claims, 6 Drawing Figures

HULL PROTECTING FENDER APRON

This is a continuation in part of patent application, Ser. No. 06/674,647 filed 11/26/84 now abandoned.

BACKGROUND OF THE INVENTION

1. Field of the Invention

This invention relates to the protection of the outer surface finish of a boat hull from the wearing, marring, and contamination from contact with a fender placed between the boat and a piling, dock, seawall, and the like.

2. Description of the Prior Art

Boat fenders have been made with a variety of materials and configurations to protect a boat from damage. However, motion of the boat generally causes motion of the fender against the boat either rolling, sliding, or scraping in nature which mars the boat finish and also transfers contaminants. Woven fender covers have been used to protect the boat finish, but they tend to wear the paint as well as enhancing transfer of contaminants.

SUMMARY OF THE INVENTION

It is an object of the invention to provide a simple, inexpensive, readily applicable apron for protecting the boat finish from the action of a fender. It is a further object to provide an apron which is easy to use and easy to stow when not in use. The present invention provides a resilient, transparent plastic sheet, suspendable by its corners against the side of the boat between the fender and the boat. I have discovered that a flexible plastic sheet of appropriate thickness and resiliency will tend to gently cling to the hull without sliding against the hull when the fender moves against it. The motion and marring actions of the fender are thereby directed against the exterior surface of the apron without being transferred to the boat surface.

The motion of the fender against the piling, dock, seawall and the like will transfer shells, concrete, creosote and debris to the fender. The motion of the fender against the boat surface subsequently transfers these contaminants from the fender to the boat surface at the point of contact. It is a further object of the present invention to prevent this transfer of contaminants from the fender to the boat finish by providing an apron which has the unique property of taking up the relative motion of the fender at the boat on its outer surface, thereby preventing transfer of the contaminants to the boat surface finish.

Furthermore, the transparent nature of the plastic of the invention reduces the visibility of any apron material which may inadvertently be forced onto the boat finish by pressure and is relatively invisible in use and does not obscure the beauty of the vessel.

These and other features, objects, advantages and modes of utility of the present invention will be apparent from the following description taken in conjunction with the accompanying drawings.

DETAILED DESCRIPTION OF THE PREFERRED EMBODIMENT

Figure 1:
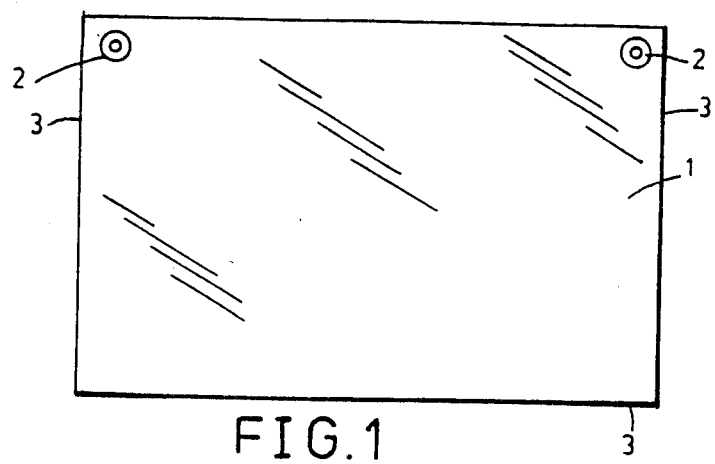
FIG. 1 is a plan view of the invention.

The apron 1 of the invention shown in FIG. 1 is fabricated from sheet stock of flexible, resilient, transparent plastic having grommets 2 installed at its corners. The strength of the sheet may be suitably reinforced around said grommets, or along the edges 3, by an extra ply of sheet material. Such reinforcement has not been found essential to the successful operation of the invention. I have found that transparent, flexible, polyvinyl chloride plastic sheet stock in thicknesses from 1.5 to 4.2 millimeters can be used to make the apron of the invention with the desired properties.

Figure 2:
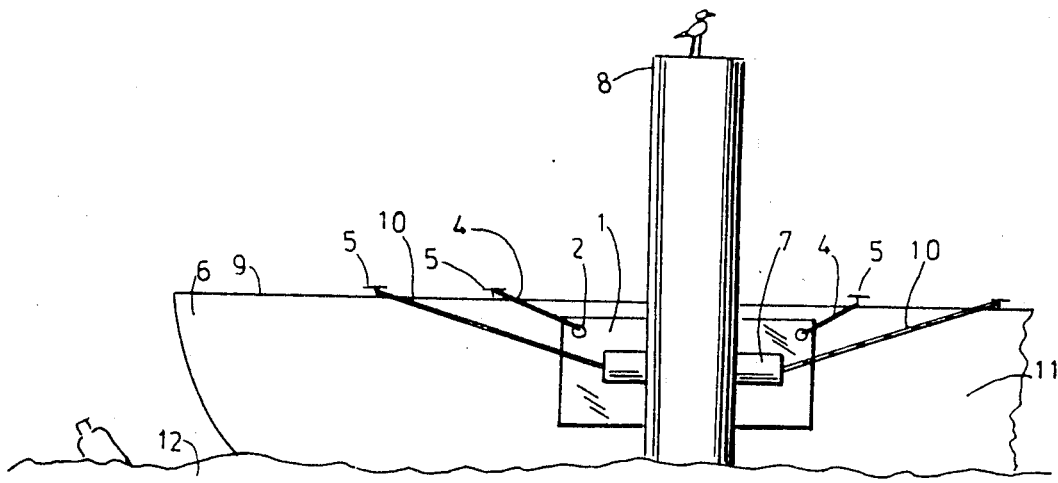
FIG. 2 is a side view of a boat with the invention in use.
Figure 3:
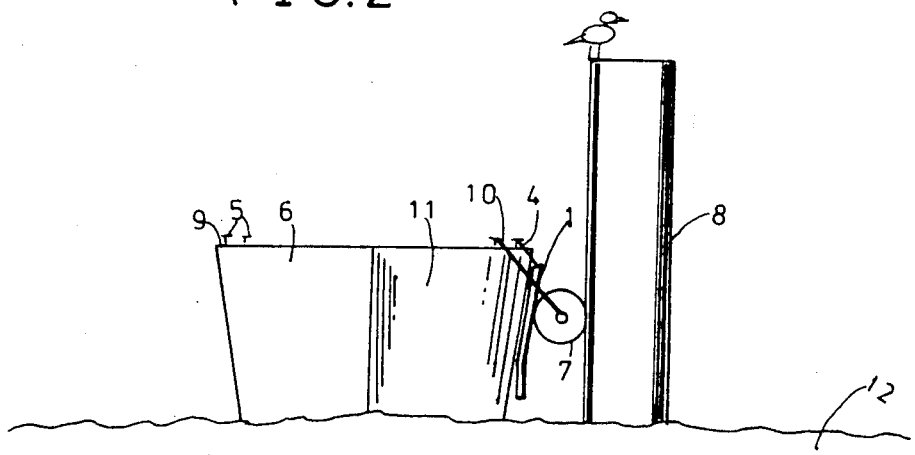
FIG. 3 is a front view of the boat of FIG. 2.

Rustproof grommets 2 may be installed at just the upper corners or at all four corners to permit further use if a grommet is damaged. The invention in use is illustrated in FIGS. 2 and 3. The apron 1 is shown in side view in FIG. 3 in exaggerated thickness for illustrative purposes. The apron 1 is suspended by lines 4 from line securing cleats 5 on gunwale 9 of boat 6, draped between boat 6 and fender 7. Fender 7 is secured by lines 10 to boat 6. The fender 7 fends off and protects the boat from exposure to the piling 8 which may be coated with creosote and/or encrusted with sharp shells. The apron 1 of the invention protects the exterior finish 11 of boat 6 from actions of the fender 7, especially as the boat moves about in the water 12 from wind, tide and wave motion relative to the stationary piling 8. As the boat 6 moves, the fender 7 also moves, but there is always some motion of the fender 7 relative to the boat surface. Because of the unusual properties of apron 1, it clings gently to the boat surface without motion relative to that surface under the action of the fender motion. Any fender motion, rolling, scraping, marring or material transfer is thereby against the exterior surface of apron 1 and is not transferred to boat surface finish 11.

Figure 4:
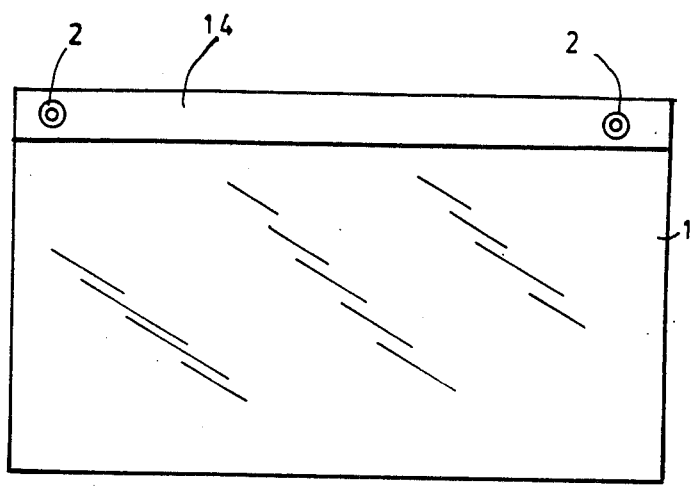
FIG. 4 is a plan view of another embodiment of the invention.
Figure 5:
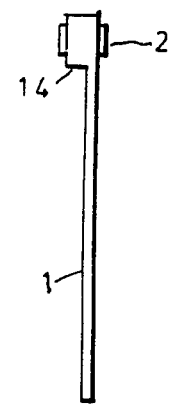
FIG. 5 is a side view of the device of FIG. 4.
Figure 6:
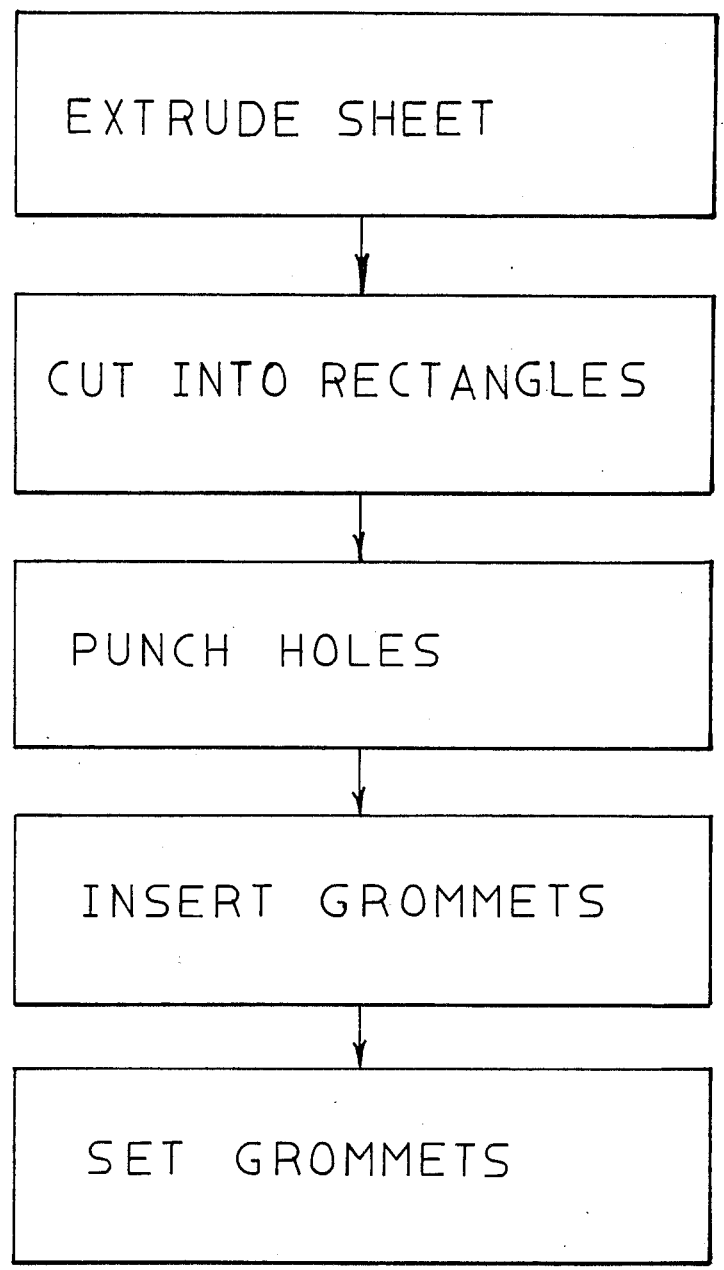
FIG. 6 illustrates by flow diagram a method of making the invention.

In another embodiment of the invention shown in plan view in FIG. 4 and side view in FIG. 5, the apron is formed from an extruded sheet of plastic having a thickened upper edge 14 into which the grommets 2 are fastened. This provides a stronger upper margin for more securely holding the grommets and holding the apron in operating position. Extrusion machinery and processes well known in the plastic forming art may be used to mix, melt and pressurize plastic with a rotating screw and force it through a forming die to provide it with the desired shape. The continuous extruded sheet leaving the forming die may be slit by slitting saws to the desired width and cut to length by automatic saws or shears on the output of the extruder as is well known in the art. The corner grommets may be installed with hand tools and methods well known in the handicraft and leatherworking arts including punches for punching the holes and grommet setting devices for locking the grommets in place after they have been installed in the holes. Alternatively, automatic machinery well known in industry may be employed for automatically punching the holes, inserting the grommets and setting the grommets.

The apron of the invention when not in use may be conveniently rolled up and stowed away. It will be readily apparent that the simplicity and economy of construction and use of the instant invention will be very cost effective in preserving and protecting the expensive surface finish of a boat.

It will be obvious to one skilled in the art that various changes may be made in the invention without departing from the spirit and scope thereof and therefore the invention is not limited by that which is illustrated and described in the specification, but only as indicated in the accompanying claims.

What is claimed is:

1. A boat hull protecting fender apron for protecting the surface finish of the hull of a boat from damage caused by the outer surface covering of a portable fender, comprising a sheet of transparent flexible resilient material, substantially rectangular in shape with two upper corners and two lower corners, including suspending grommet means in said two upper corners adapted for securing lines therethrough, said suspending grommet means adapted as the sole means for securing said apron in a position between said hull and said fender, wherein said plastic material is adapted so as to resist movement against said hull when said fender moves against said apron.

2. The invention of claim 1, wherein said plastic material is a polyvinyl chloride.

3. The invention of claim 1, wherein said sheet has a thickness of between 1.5 millimeters and 4.2 millimeters.

4. The invention of claim 1, wherein said sheet has an upper edge portion of a thickness greater than the balance of said sheet and said suspending grommet means are attached to said upper edge portion for improved securing of said apron.

5. The invention of claim 4, wherein said plastic material is a polyvinyl chloride.

6. A method of making a boat hull protecting fender apron for protecting the surface finish of the hull of a boat from damage caused by the outer surface covering of a portable fender, comprising the steps of:
   a. extruding a sheet of transparent flexible resilient material;
   b. cutting said sheet into rectangles having two upper and two lower corners;
   c. fastening grommet means into said two upper corners of said sheet to allow the apron to be suspended from the boat with securing lines;
   d. said fastening grommet means adapted as the sole apron support means for securing said apron in a position between said hull and said fender.

7. The method of claim 6, wherein said sheet is of polyvinyl chloride.

8. The method of claim 6, wherein said sheet has of a thickness of between 1.5 millimeters and 4.2 millimeters.

9. The method of claim 6, wherein said sheet has an upper edge portion of a thickness greater than the balance of said sheet and said grommet means are attached to said upper edge portion for improved securing of said apron.

* * * * *